Feb. 8, 1927. 1,616,698
D. MILLER
QUICK CLOSURE BALL COCK
Filed Jan. 4, 1926

INVENTOR.
David Miller
BY Nestall and Wallace
ATTORNEYS.

Patented Feb. 8, 1927.

1,616,698

UNITED STATES PATENT OFFICE.

DAVID MILLER, OF LOS ANGELES, CALIFORNIA.

QUICK-CLOSURE BALL COCK.

Application filed January 4, 1926. Serial No. 79,086.

This invention relates to a ball cock mechanism for use in toilet flush tanks and for like purposes. It appertains more particularly to a valve structure operated by a float. In flush tanks, a valve controlling the inflow of water is operated by a float. As now commonly constructed, the float is linked to the valve in such a manner that closure of the valve is progressive with the rise in level of the water in the tank. This results in noisy operation due to the inrushing water passing through a restricted valve opening, the noise becoming greater as the valve approaches its closed position.

The present invention has for its primary object the provision of a ball cock structure wherein the valve is maintained in wide open position until the water has completely filled the tank, whereupon the valve is then closed at once. Another object of this invention is to provide a device of the character described wherein there is a mechanism for retarding closure of the valve, this mechanism being operated to release and permit the closure of the valve, when the water has reached its highest level in the flush tank. A further object of this invention is to provide a device of the character described wherein the retarding device is operated by a float and no springs or like resilient devices are required.

Figure 1:
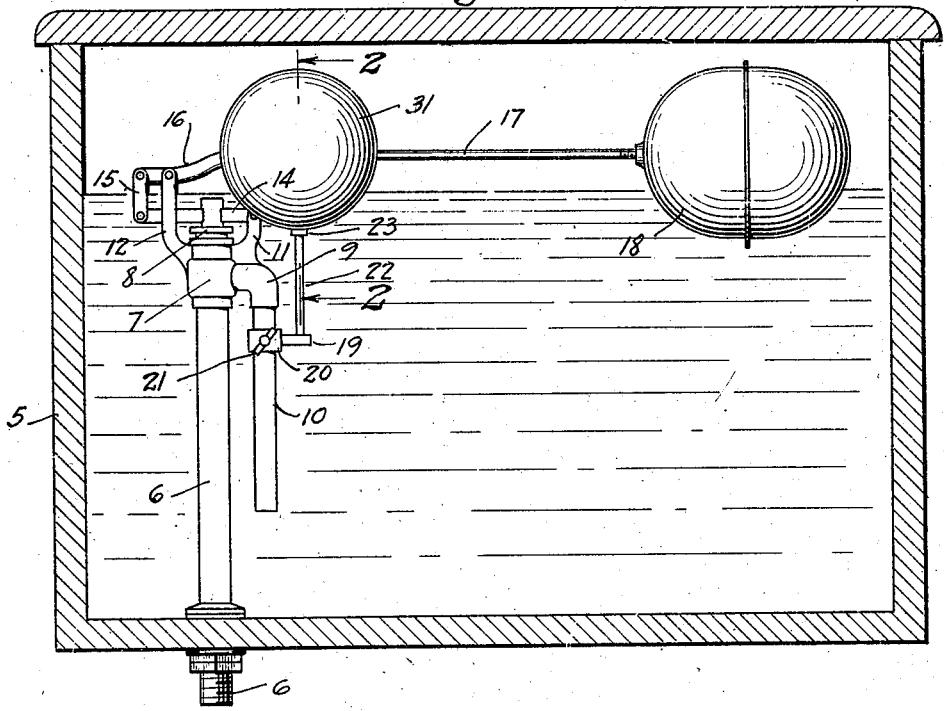
Figure 2:
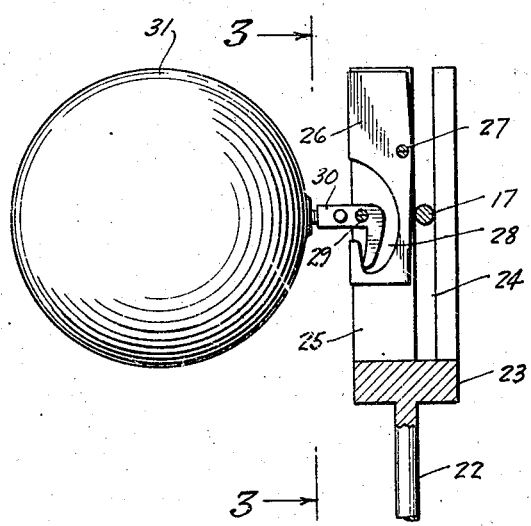
Figure 3:
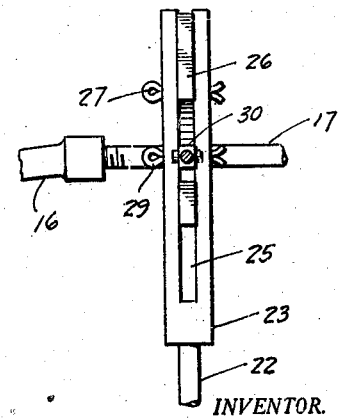

These objects together with other objects and corresponding accomplishments are obtained by means of the embodiment of my invention illustrated in the accompanying drawing, in which:

Fig. 1 is a vertical section through a flush tank showing the ball cock mechanism including the retarding structure; Fig. 2 is a fragmentary view as seen on the line 2—2 of Fig. 1 on an enlarged scale; and Fig. 3 is a section as seen on the line 3—3 of Fig. 2.

Referring more particularly to the drawings, a flush tank of the usual construction is indicated by 5. Extending through the bottom of the tank is a pipe 6 adapted to be connected to the house service pipes for the supply of water to the tank. Within the tank and mounted upon the top of the pipe 6 is a fitting comprising a body 7 having an opening at the top to receive a plug valve 8. Extending laterally from the body is an elbow 9 to which a pipe 10 extending downwardly is connected. The plug 8 controls the discharge of water from pipe 6 through the discharge pipe 10. By raising the plug valve 8, the valve is opened, and when lowered it is closed. An upright bracket arm 11 is mounted on the body and on the opposite side thereof is a bracket arm 12.

Pivotally secured to arm 11 is a lever arm 14 connected to the valve plug 8. Pivotally connected to the end of lever 14 is a link 15 which is connected at its other end to a lever 16 pivotally mounted in bracket 12. Connected to lever 16 is a float lever rod 17 having secured to the end thereof a ball float 18 of any approved construction. The structure just described is common and well known in the art and comprises a float operated valve in which there is a multiple lever mechanism between the float and the valve. In the operation of such a device, as the tank fills with water, float 18 rises, gradually closing valve 8 upon its seat and thereby gradually restricting the flow of water into the flush tank through pipes 6 and 10. As the valve opening is decreased, the noise of operation increases.

The present invention has for its primary object the holding of the valve mechanism in open position until the water has reached its upper level, whereupon the mechanism is released so that float 18 may move to close the valve 8 completely. Conveniently mounted upon the pipe 10 is a bracket 19 which may have a sleeve 20 slidably mounted over the pipe 10 and is equipped with a screw 21 for adjusting it in position. Upstanding from the bracket is a standard 22 having a head 23 with a slot 24 extending therethrough. The rod 17 is arranged to freely move upwardly except for such restraint as may be placed upon it by a trigger mechanism. A slot 25 is formed in the head 23 transverse to slot 24 and opening thereto. In slot 25 is a trigger catch 26 pivotally mounted as indicated by 27 so that the catch will tend to dispose itself across the slot 24. The pivotal axis is so disposed in the catch with its relation to the center of gravity, that the lower end of the catch tends to swing across the slot 24. A hook opening 28 is formed in the catch and opens outwardly. Pivotally mounted upon a pin 29 is a hook 30. The pin 29 extends through the head 23 and in such a position that hook 30 is disposed within the hook opening 28 of the trigger catch. The free end of the hook is arranged to engage the catch 26 on its outer side, and when the shank of the hook is horizontal, to hold the catch in the position shown in Fig. 2 wherein it is out of the slot 24. Secured to the shank of the hook 30 is a ball float 31.

The arrangement is such that if the ball float 18 is in its lowest position, the tank having been drained, then ball float 31 will have moved downwardly disposing the end of hook 30 so that the catch 26 may swing and dispose itself within the slot 24. This disposes the catch so that it prevents movement of the float 18 into its upper position and thereby prevents the valve from being closed. Water will begin to fill the tank, and will act upon the float 18 tending to raise the latter. However, it is prevented from being raised by the trigger catch. When the level of the water reaches the float 31, it raises the latter and the hook 30 begins to act upon the trigger catch to retract it from slot 24. When it has been moved out of the slot the ball float 18 suddenly rises closing the valve 8. It is obvious that the ball float 18 upon drainage of the tank can move freely downwardly in the slot and pass the trigger catch 26.

What I claim is:

1. In a flush tank, a ball cock mechanism comprising a main float for opening and closing an inlet valve, a lever rod for connecting said main float and valve, a standard, a trigger catch, pivotally mounted so it is free to swing on said standard and adapted to dispose itself in the path of said rod when the latter is in its lower position so as to restrain said rod in its upward travel, and an auxiliary float mechanism for engaging and operating said catch to move the latter out of the path of said rod upon the water in said tank reaching its uppermost level, said catch being adapted to be held out of the way by said lever rod in the downward travel of the rod.

2. In a flush tank, a ball cock mechanism comprising an inlet pipe and an inlet valve, a main float for opening and closing the inlet valve, a lever rod connecting said main float and inlet valve; an auxiliary unit comprising a standard for mounting on said pipe, a trigger catch pivotally mounted so it is free to swing on said standard and adapted to dispose itself in the path of said rod, when the latter is in its lower position, so as to restrain said rod in its upward travel, and an auxiliary float mechanism for engaging and operating said trigger catch to move the latter out of the path of said rod upon the water in said tank reaching its uppermost level, said catch being adapted to be held out of the way by said lever rod in the downward travel of the rod.

3. In a flush tank, a ball cock mechanism comprising a main float for opening and closing an inlet valve, a lever rod for connecting said main float and valve, a standard, a trigger catch pivotally hung on said standard so that it is free to swing and adapted to dispose itself by the action of gravity in the path of said rod, when the latter is in its lower position, so as to restrain said rod in its upward travel, and an auxiliary float mechanism separate from said trigger catch for engaging and operating the latter to move it out of the path of said rod upon the water in said tank reaching its uppermost level, said catch being adapted to be held out of the way by said lever rod in the downward travel of the rod.

In witness that I claim the foregoing I have hereunto subscribed my name this 28th day of December, 1925.

DAVID MILLER.